US008464346B2

(12) United States Patent
Barai et al.

(10) Patent No.: US 8,464,346 B2
(45) Date of Patent: Jun. 11, 2013

(54) METHOD AND SYSTEM SIMULATING A HACKING ATTACK ON A NETWORK

(75) Inventors: Bikash Barai, West Bengal (IN); Nilanjan De, West Bengal (IN)

(73) Assignee: IVIZ Techno Solutions PVT. Ltd, West Bengal (IN)

(*) Notice: Subject to any disclaimer, the term of this patent is extended or adjusted under 35 U.S.C. 154(b) by 30 days.

(21) Appl. No.: 12/451,460

(22) PCT Filed: May 22, 2008

(86) PCT No.: PCT/IN2008/000333
§ 371 (c)(1),
(2), (4) Date: Nov. 13, 2009

(87) PCT Pub. No.: WO2008/142710
PCT Pub. Date: Nov. 27, 2008

(65) Prior Publication Data
US 2010/0138925 A1    Jun. 3, 2010

(30) Foreign Application Priority Data
May 24, 2007   (IN) .............................. 797/KOL/2007

(51) Int. Cl.
*G06F 21/00*   (2006.01)

(52) U.S. Cl.
USPC ............... 726/25; 726/22; 380/200; 380/242; 705/18; 711/164

(58) Field of Classification Search
USPC .......................................................... 726/25
See application file for complete search history.

(56) References Cited

U.S. PATENT DOCUMENTS

| 6,131,120 | A  | * | 10/2000 | Reid .............................. 709/225 |
| 7,380,270 | B2 | * | 5/2008  | Tracy et al. ........................ 726/3 |
| 7,673,323 | B1 | * | 3/2010  | Moriconi ........................... 726/1 |
| 7,774,849 | B2 | * | 8/2010  | Russell et al. ................... 726/25 |
| 7,895,651 | B2 | * | 2/2011  | Brennan ........................... 726/22 |
| 8,122,499 | B2 | * | 2/2012  | Hall ................................. 726/22 |
| 2003/0084344 | A1 | * | 5/2003  | Tarquini et al. ............... 713/201 |
| 2005/0138109 | A1 | * | 6/2005  | Redlich et al. ................. 709/201 |

(Continued)

FOREIGN PATENT DOCUMENTS

WO   WO 2004/031953 A1   9/2003
WO   WO 2008/142710 A3   11/2008

OTHER PUBLICATIONS

Espacenet search, Espacenet Result List, Feb. 2012.*
Chinchani, Ramkumar et al., "Towards a Theory of Insider Threat Assessment," In Proceedings of the 2005 International Conference on Dependable Systems and Networks (DSN '05), Jun. 28, 2005, pp. 108-117.

(Continued)

*Primary Examiner* — Andy Rao
*Assistant Examiner* — Shan Elahi

(57) ABSTRACT

The present invention describes a method for performing one or more social engineering attacks on a plurality of humans connected in a network for assessing vulnerabilities of the humans, wherein the Network comprises at least one of a plurality of data processing devices, memory devices and a plurality of communication links. The method includes gathering information about human profiles including collecting information about target users from actively used social and search sites and performing an automated Social Engineering (SE) phase and updating an Information Model based on the gathered information. Furthermore, the method includes generating a Multiple Attack Vector (MAV) graph based on the information gathered and one or more scan parameters. Moreover, the method includes launching one or more social engineering attacks based on the MAV graph to assess vulnerabilities in the humans in the Network.

18 Claims, 12 Drawing Sheets

U.S. PATENT DOCUMENTS

| | | | |
|---|---|---|---|
| 2005/0138110 A1* | 6/2005 | Redlich et al. | 709/201 |
| 2005/0193430 A1* | 9/2005 | Cohen et al. | 726/25 |
| 2006/0021048 A1* | 1/2006 | Cook et al. | 726/25 |
| 2006/0075502 A1* | 4/2006 | Edwards | 726/24 |
| 2007/0094735 A1* | 4/2007 | Cohen et al. | 726/25 |
| 2007/0130621 A1* | 6/2007 | Marinescu et al. | 726/22 |
| 2007/0192863 A1* | 8/2007 | Kapoor et al. | 726/23 |
| 2007/0256139 A1* | 11/2007 | Gaos et al. | 726/26 |
| 2008/0090612 A1* | 4/2008 | Glinka | 455/557 |

OTHER PUBLICATIONS

Ingols, Kyle et al., "Practical Attack Graph Generation for Network Defense," IEEE, 22nd Annual Computer Security Applications Conference, 2006 (ACSAC '06), Dec. 1, 2006, pp. 121-130.

* cited by examiner

METHOD AND SYSTEM SIMULATING A HACKING ATTACK ON A NETWORK

The invention disclosed here relates in general to a field of security in data processing units (DPUs), and more particularly, to assess vulnerabilities in a network of DPUs.

BACKGROUND

Due to the wide spread adoption of networks, corporate offices and business solutions, there is a need of robust security in the field of network communication, due to which, network security has gained enormous popularity over the last few years. Network communication and e-commerce are introducing new threats to an organization by viruses, trojans, junk mail (SPAM) senders, intruders and the like. Network refers to public network such as the Internet and private network such as Intranet. Network security involves all the activities that an organization undertakes to protect the information or data in terms of integrity, confidentiality, authentication, access controls, etc. Security measures are used to prevent non-trusted external sources, such as Internet users, as well as internal sources that can help in breaching the security of internal network or intranet. For security purpose, organizations devise various network security strategies. Network security strategies include various technical features for identifying threats and choosing the various tools to combat them. For example, the organization can carry out a detailed risk assessment and penetration testing to determine the nature and extent of existing and potential threats in the organization.

A Data Processing Unit (DPU) is a system that can process unprocessed or semi-processed data (information) and can convert the data into a processed format. Examples of the DPU include, but are not limited to, computers, laptops, palmtops, and mobile phones, compiler, a scanner, and an interpreter. The DPU can process data through various means such as decoding, encoding, compiling, and translating.

A secure DPU should only permit authorized users to access data (information) present on it and to carry out legitimate and useful tasks. In other words, the DPU should not be vulnerable. Vulnerability refers to a flaw in the DPU that can allow a hacker or an un-authorized person to transgress at least one of access control, confidentiality, integrity, and audit mechanisms of the DPU or access the data and applications that the DPU hosts. Vulnerability can result from design flaws in the network of DPUs or carelessness of a programmer while designing the network or applications running on the DPUs or by the users (humans) working on the DPUs. Vulnerable DPUs may allow a hacker to access data or misuse an application by using various means such as bypassing access control checks or executing commands on the system hosting the application. Vulnerabilities can assume significant proportions when the program containing the vulnerability operates with special prerogatives or provides easy access to user data or facilities.

One method for protecting a vulnerable DPU is by employing access controls, deploying firewalls, constant vigilance, including careful system maintenance such as applying software patches and careful auditing. Also, there exist other methods to detect vulnerabilities associated with the network of DPUs such as the vulnerability assessment and penetration testing method that involves a human to carry out the penetration testing method. The penetration testing method is a way of detecting vulnerabilities associated with the network by simulating an attack by a hacker and may involve active or passive exploitation of security vulnerabilities. Penetration testing is carried out on the network from the position of a potential hacker and involves an active analysis of the network for any weaknesses, technical flaws, or vulnerabilities. The vulnerabilities that are identified are presented to the user or the network administrator with an assessment of their impact on the network. Thereafter, a solution can be arrived upon to eliminate the vulnerability. Though the security tools or penetration testing and other methodologies can provide an auditor of the network with an overview of possible vulnerabilities present, they can not replace human judgment entirely.

The existing methods determine vulnerabilities associated with one or more DPUs (hosts) in the network and patch them. But, the network can still be compromised when the communication links connecting the Internet, the communication links among the hosts and the communication links between the users of the hosts, are not secure. A hacker can gain access to secure and confidential data flowing via communication links by tapping the communication links and possibly can gain privilege access to the critical hosts. Further, the network can be still be compromised when the users (humans) using the DPUs are not security conscious i.e. they are not fully aware of security standards or do not follow them. For example, a naive or vulnerable user can leak information to a spoof website or provide information to an unauthorized person by mistake or on purpose. Further, in order to compromise a critical DPU or to gain access to critical information present at a DPU, the hacker can compromise other intermediate and possibly non critical resources on the network (such as humans, other DPUs, and communication links). Thereafter, he can gain access to the critical DPU in an indirect manner through the compromised resources. Invariably, these systems involve extensive manual participation in accessing the vulnerabilities of the network.

The existing methods although provide ability to launch exploits automatically on one or more DPUs (hosts) in the network and compromise them but they still need manual intervention in collecting the relevant information and vulnerabilities about the network, then manually plan the attack and then manually launch the attack to get access to DPUs. Hence automated planning of attacks is still missing from existing methodologies.

There is no prior art that describes a non-manual intervened or automatic method, system and computer program product allowing integration of different methods, systems and computer programs, correlating their results, planning the exploitation and performing penetration testing automatically and without any human intervention.

Finally, there is no prior art that describes a non-manual intervened or automatic method, system and computer program product to perform penetration testing for a network of DPUs, inclusive of communication links in the network and users working on the DPUs (hosts).

In light of the foregoing discussion, there is a need to provide a method, system and computer program product to assess all vulnerabilities associated with the network of DPUs inclusive of communication links in the network and users working on the DPUs (hosts) and to perform an automated planning and execution of penetration testing on the network.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

SUMMARY

Figure 1:
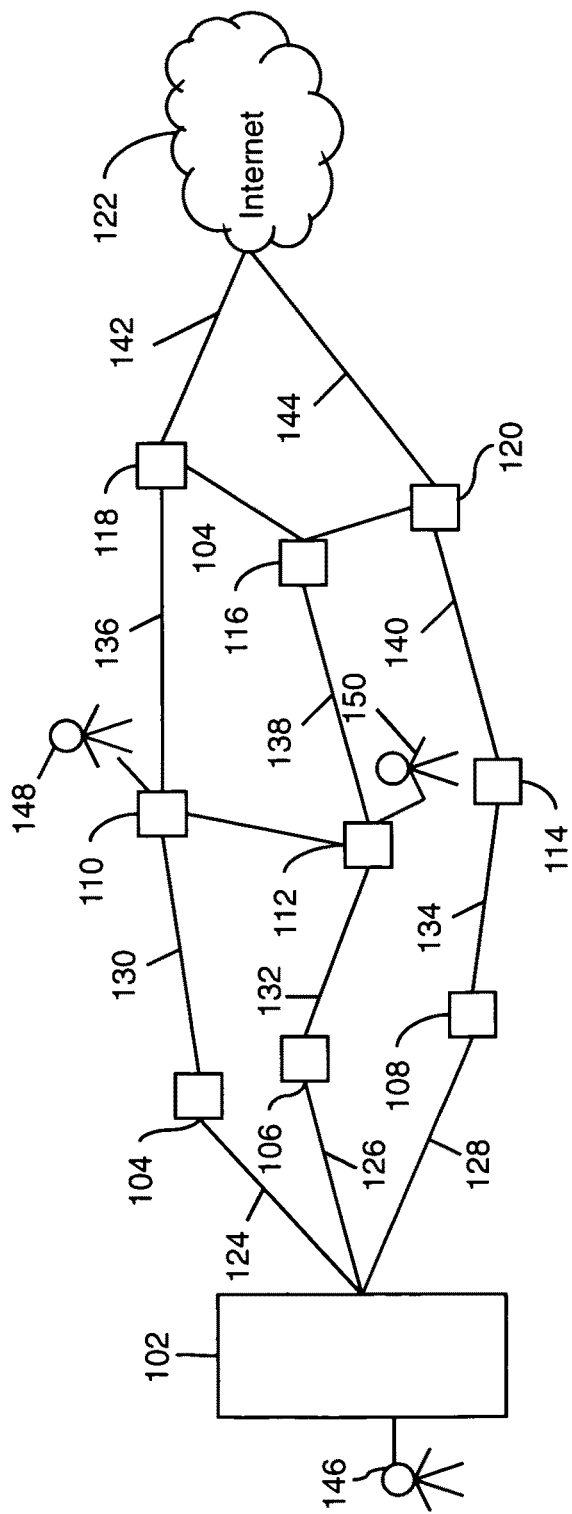
FIG. 1 is an exemplary environment in which the present invention can be practiced, in accordance with an embodiment of the present invention.

The present invention describes a method for simulating a hacking attack on a Network, wherein the Network comprises at least one of a plurality of data processing units (DPUs), a plurality of users and a plurality of communication links, to assess vulnerabilities of the Network. The method includes receiving one or more scan parameters for the Network. Further, the method includes creating at least one master agent by a system to gather information about the Network, wherein the information pertains to critical and non-critical information about the Network. The method includes creating an Information Model and then incrementally updating the Information Model during the hacking attack. The Information Model is the abstract representation of information collected by the system. Furthermore, the method includes generating a Multiple Attack Vector (MAV) graph based on one or more scan parameters and the Information Model. Moreover, the method includes launching one or more attacks based on the MAV graph to compromise the Network. The method further includes installing at least one slave agent on the compromised Network to perform the one or more attacks in a distributed manner. Moreover, the method includes performing a multi stage attack by using the at least one slave agent and the at least one master agent by repeating above steps. Finally, the method includes generating a report by the scan controller, wherein the report contains details about the compromised Network and the vulnerabilities of the Network.

The present invention presents a system for simulating a hacking attack on a Network wherein the Network comprises at least one of a plurality of data processing units (DPUs), a plurality of users and a plurality of communication links to assess vulnerabilities of the Network. The system includes an automated Social Engineering (SE) architecture for collecting sensitive information that pertains to the plurality of users. Further, the system includes a communication link framework for identifying vulnerabilities associated with the Network and communication protocols. Moreover, the system includes a Multiple Attack Vector engine (MAV) for to generate all possible attack paths by which the Network can be compromised.

The present invention describes a method for simulating a hacking attack on a Network, wherein the Network comprises at least one of a plurality of data processing units (DPUs), a plurality of users and a plurality of communication links, to assess vulnerabilities of the Network. The method includes receiving one or more scan parameters for the Network. Further, the method includes creating at least one master agent by a system to gather information about the Network, wherein the information pertains to critical and non-critical information about the Network. The method includes creating an Information Model and then incrementally updating the Information Model during the hacking attack. The Information Model is the abstract representation of information collected by the system. Furthermore, the method includes generating a Multiple Attack Vector (MAV) graph based on one or more scan parameters and the Information Model. Multiple Attack Vector (MAV) has the ability to combine plurality of low and medium severity vulnerabilities associated with the data processing units (DPUs), users and communication links, correlate vulnerabilities in combination with Information Model and generate high severity attack paths that can lead to compromise of the Network. Moreover, the method includes launching one or more attacks based on the MAV graph to compromise the Network. The method further includes installing at least one slave agent on the compromised Network to perform the one or more attacks in a distributed manner. Moreover, the method includes performing a multi stage attack by using the at least one slave agent and the at least one master agent by repeating above steps. Finally, the method includes generating a report by the scan controller, wherein the report contains details about the compromised Network and the vulnerabilities of the Network.

DETAILED DESCRIPTION

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

FIG. 1 is an exemplary environment in which the present invention can be practiced, in accordance with various embodiments of the present invention. FIG. 1 shows a number of Data Processing Units (DPUs) connected together along with various components of a DPU network such as a main frame server, intranet, the Internet. Examples of DPUs can be various computational devices such as a personal computers, laptop computers, mobile phones, Personal Digital Assistants (PDAs), Blackberry®, smart phones, and so forth. Further, various examples of networks through which different DPUs can exchange information or data between themselves can be a Local Area Network (LAN), Wide Area Network (WAN), a Wireless LAN, Metropolitan Area Network (MAN), Public Switched Telephone Network (PSTN), a global Telecommunications Exchange (TELEX) network, a Global System for Mobile (GSM) communication network, a Code Division Multiple Access (CDMA) network, and so forth. In addition, different DPUs in the network can communicate with each other using various network topologies such as Transport Control Protocol (TCP), Internet Protocol (IP), User Datagram Protocol (UDP), Simple Mail Transport Protocol (SMTP), Session Initiation Protocol (SIP), Post Office Protocol (POP), and other protocols that are very well known in the art. With specific reference to the components shown in FIG. 1, an exemplary environment is shown to include a main frame terminal 102, one or more DPUs, also referred to as hosts, 104, 106, 108, 110, 112, 114, and 116, one or more gateways 118 and 120, one or more communication links 124, 126, 128, 130, 132, 133, 136, 138, 140, 142, and 144, one or more network users 146, 148, and 150, and an outside network as depicted by the Internet 122. The one or more hosts or DPUs 104, 106, 108, 110, 112, 114, and 116 include an Operating System (OS), such as MS Windows®, Linux, Unix®, and one or more data processing applications running on it. The one or more network users (also referred to as users) 146, 148, and 150 are humans working on the DPUs. The one or more communication links 124, 126, 128, 130, 132, 134, 136, 138, 140, 142 and 144 include the communication links that connect different DPUs, the communication links between the network users and the communication links connecting the Network with an outside network such as Internet 122 via gateways 118 and 120. A communication link is not just a physical link between the users of the hosts or among the hosts, but also includes the wireless or wired communication protocol that is being used to exchange data or information between different DPUs, network users, etc. For example, in case of computer networks, the communication between two or more DPUs can take place by using a TCP/IP connection, and in case of a tele-conference, or a web-conference, users of the DPUs may be using phone lines or Voice over Internet Protocol (VoIP).

For the sake of understanding of this invention, we will define the Network as comprising at least one of a plurality of DPUs connected together, a plurality of users working on the DPUs, and a plurality of communication links connecting different components of the Network together. It should be noted and appreciated that this refined and extended definition of Network (at times also referenced as 'network') will be used in the rest of the patent application.

When a hacker wants to attack a Network or a system administrator wants to assess vulnerabilities of the Network, his main aim is to compromise at least one of the DPUs of the Network, the users and the communication among one or more DPUs and users and then carry out further attacks on the Network by using the information or data from the compromised Network. In general, threats to the Network security can come from outside the Network (for example, through the Internet 122), through gateways such as 118 and 120, through users of the Network such as 146, 148, and 150 (for example, leakage of confidential data), and through the communication links such as 124, 126, 128, 130, 132, 133, 136, 138, 140, 142, and 144 and from inside the Network through exploitation of critical vulnerabilities of the DPUs, and through confidential data leakage via the communication links. A typical threat can arise for the Network when the communication links connecting the hosts or the users of the hosts are compromised and the attacker (or hacker, system administrator) gains access to the data flowing through the communication links. Further, in order to compromise the Network, at least one of the DPUs, the users and the communication links have to be compromised in a predefined sequence or in an indirect manner.

Figure 2:
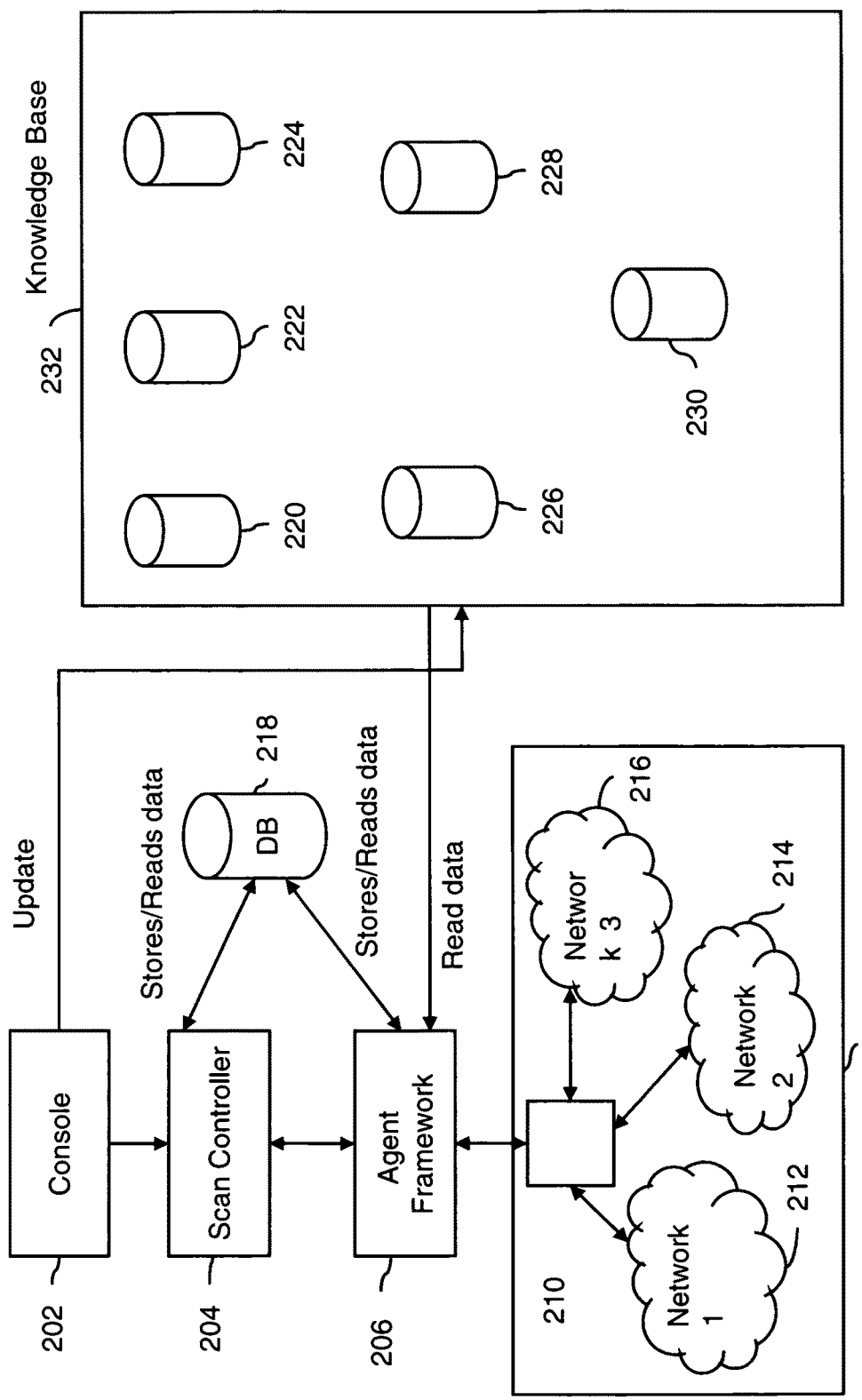
FIG. 2 is a block diagram illustrating the components of overall system, in accordance with an embodiment of the present invention.
Figure 4:
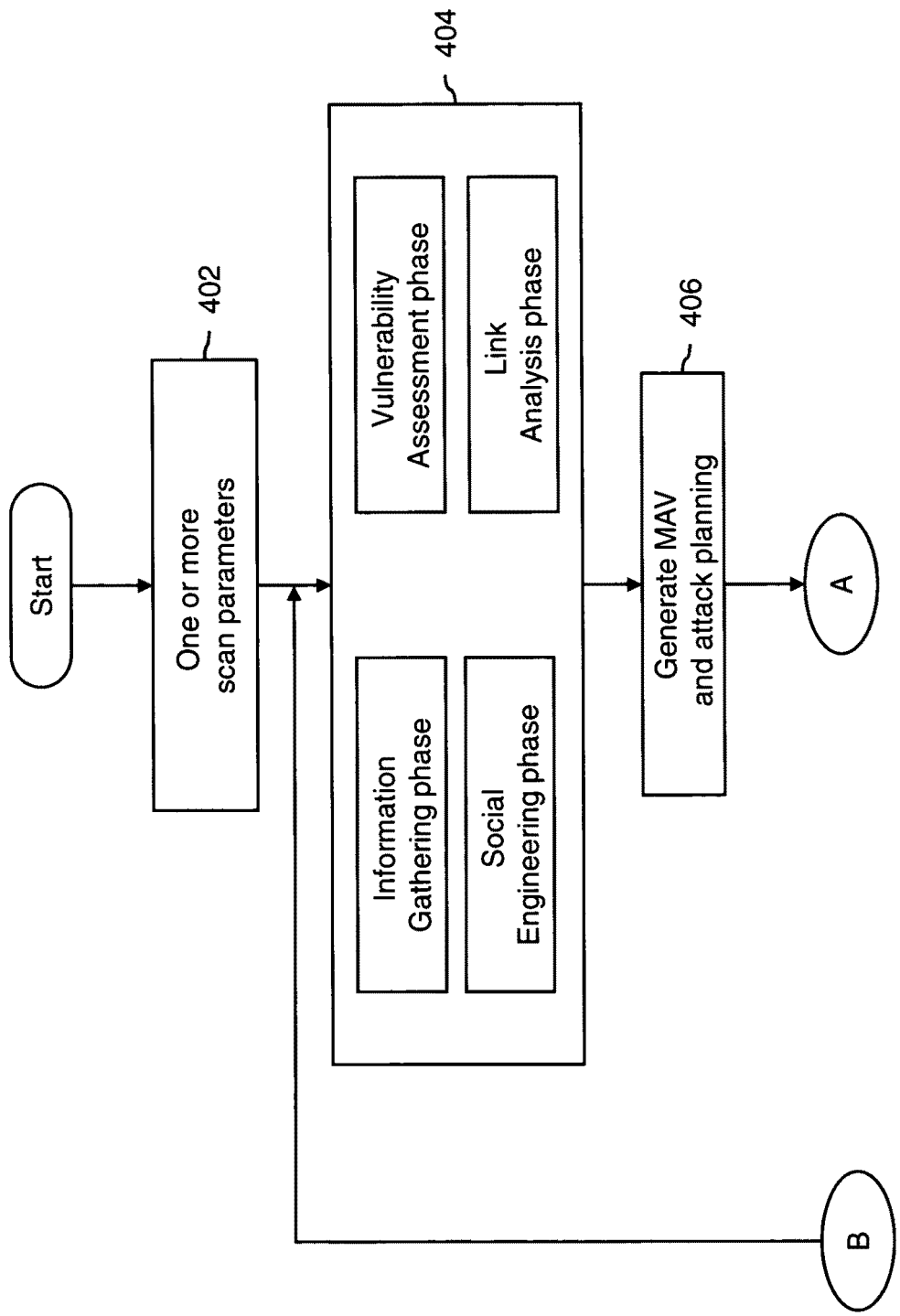
FIGS. 4A and 4B show a flow diagram illustrating a detailed method for simulating the hacking attack on the network, in accordance with an embodiment of the present invention.
Figure 4:
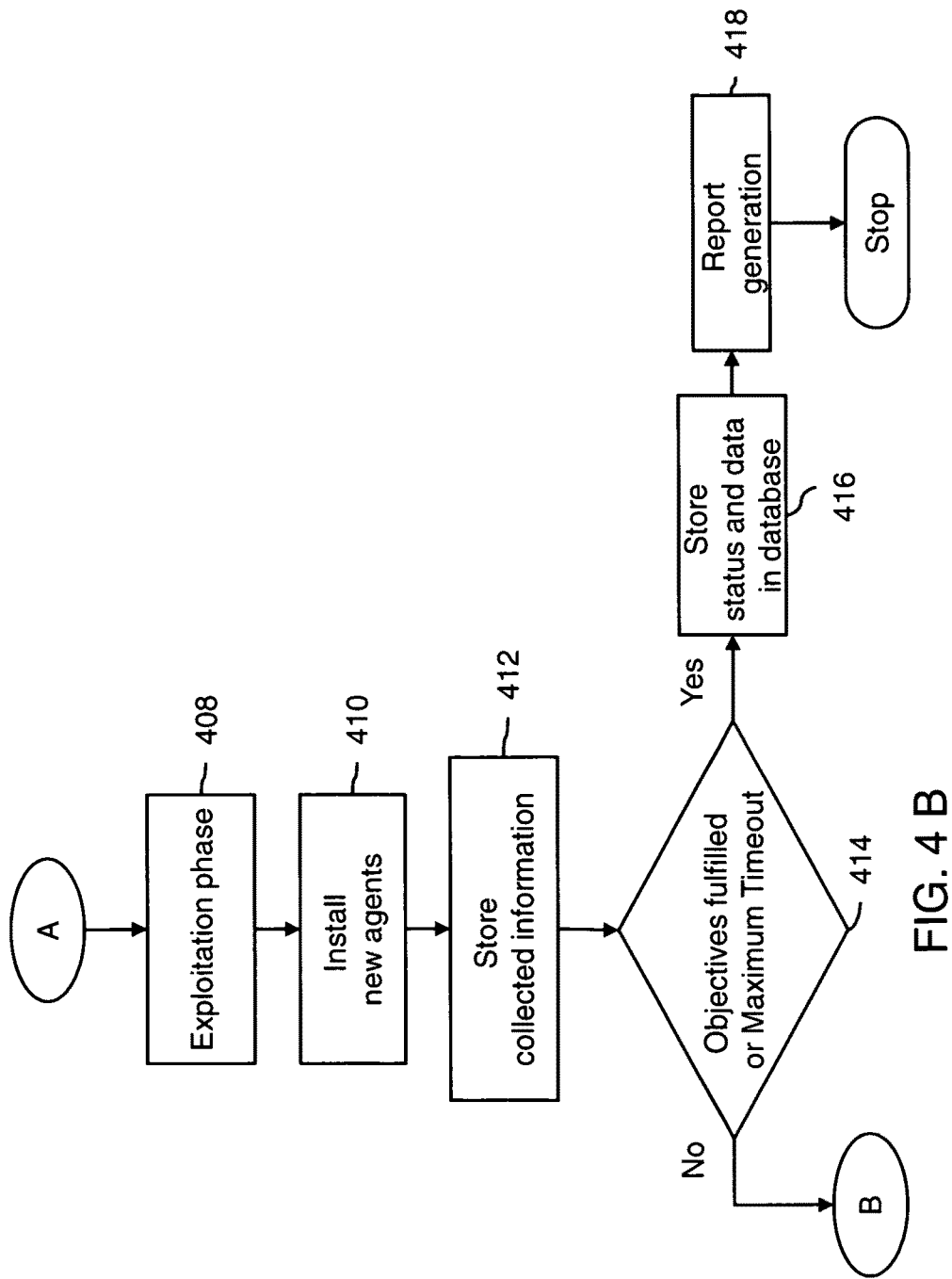

FIG. 2 is a block diagram illustrating the components of overall system, in accordance with various embodiments of the present invention. The system shown in FIG. 2 can be used to assess vulnerabilities of the Network or to carry out a hacking attack on the Network. More specifically, FIG. 2 shows a console 202, a scan controller 204, an agent framework 206, network 208, a database 218, and a knowledge base 232. The design of the system is based on a Model, View and Controller (MVC) architecture i.e. the system is broken down into three parts namely a model, a view, and a controller. The console 202 is a graphical user interface through which a user can input one or more scan parameters for the network 208. The scan parameters can be the information about the network 208, such as an IP address or a Media Access Control (MAC) address, etc. In addition, the hacker or the system administrator can use the console 202 to specify actions or directions that need to be taken on the output of the attack on the network 208. The scan controller 204 is responsible for initiating a scan on the network 208, creating or initiating a master agent, reviewing the status of the scan and generating a report after the attack or vulnerability assessment of the network 208 is over. The scan controller 204 is functionally connected with database 218 to access the data stored in it. The database 218 is used to store the scan parameters, temporary data for the scan and final results of the scan, where the results are further used to generate the report. The scan controller 204 uses this data to generate an attack plan, generate vulnerability assessment report for the network 208, etc. The master agent initiates one or more attacks on the Network. The master agent encapsulates one or more functional modules. The one or more functional modules are information gathering module, vulnerability assessment module, Link Analysis module, social engineering module, an exploitation module, etc. These functional modules interact with each other at different stages of the vulnerability assessment or hacking attack on the Network. More specifically, these functional modules can perform their respective functions during information gathering phase, vulnerability assessment phase, social engineering phase, Link Analysis phase, and exploitation phase. Each of the information gathering phase, vulnerability assessment phase, social engineering phase, Link Analysis phase and exploitation phase have been discussed in detail later in conjunction with FIG. 4A and FIG. 4B. The agent framework 206 gathers the information about the network 208 and launches one or more attacks on the Network. The agent framework 206 can read the data from the knowledge base 232. The agent framework 206 can support dynamic and wide range of functionality support. The agent framework 206 provides dynamic control over functionalities such as start, stop, pause, load, and unload functionality. One or more new functionalities that are compatible with the agent framework 206 can be created and uploaded in the knowledge base 232. The functionalities associated with the agent framework 206 are generic and applicable for the one or more attacks on the Network. Functionality of the agents can be integrated with commercial or non-commercial software. The agents can be integrated with authentication mechanism and secure communication. The agents support various types of authentication methods such as password based authentication, key based authentication, etc. The agents also support SSL and other secure communication methods. The network 208 further includes a firewall 210, a network 1 212, a network 2 214, and a network 3 216. The network 1 212, network 2 214, network 3 216 are the sub-networks of the network 208. For example, network 1 212 can be an e-mail exchange server, whereas the network 2 214 and the network 3 216 can be two different data servers. The database 218 stores the data pertinent to the scan and business information of the model. The database 218 is encapsulated by the model of the MVC architecture. The database 218 is a repository of structured collection of stored data or information such that the data can be accessed for future use. In an embodiment of the present invention, a software program can use the data from the database 218 for answering queries and making decisions. The knowledge base 232 stores specific information pertinent to the scan. The knowledge base 232 further includes information gathering repository 220 for storing critical and non critical information about the network 208 such as names and addresses of open ports present in the different DPUs, Operating System (OS) details, running applications, humans (such as employees of an organization and their related information), routers, switches, firewalls, and networking protocols like Dynamic Host Configuration Protocol (DHCP) and Domain Name Server (DNS), vulnerability assessment repository 222 for storing the vulnerabilities associated with DPUs and applications running on them, social engineering repository 224 for storing the possible actions or humans behavior in the network and the corresponding vulnerabilities associated with humans such as stealing passwords, sniffing mail from the network, etc., Link Analysis repository 226 for storing the vulnerabilities associated with networking and communication protocols such as ARP poisoning, DNS poisoning, port stealing, etc., MAV repository 228 for storing the information about the multiple attack vectors that shows the possible paths for the one or more attacks on the network 208, exploit repository 230 for storing the information gathered by the exploitation phase i.e. the information gathered after the one or more attacks has been made on the network 208. The information stored in the knowledge base 232 is constant for one scan i.e. the information stored for one particular scan is not going to be changed. The knowledge base 232 can be updated by the user through the console 202. The view contains the layouts which are rendered at the runtime to present the user with the console 202 in order to enable the user to interact with the system.

Figure 3:
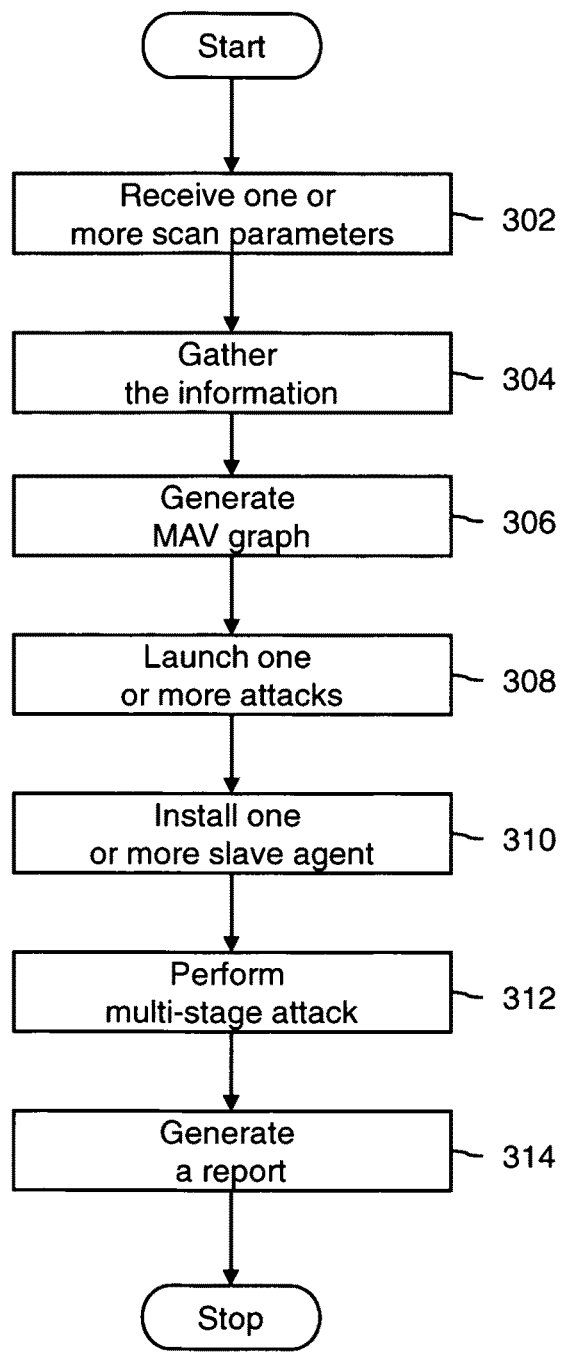
FIG. 3 is a flow diagram illustrating a broad level method for simulating a hacking attack on the network, in accordance with an embodiment of the present invention.

FIG. 3 is a flow diagram illustrating a method for simulating the hacking attack on the Network, in accordance with various embodiments of the present invention.

At step 302, the user inputs the scan parameters for the network through the console 202. The scan parameters are such as scope of the scan, a predefined time for the scan, initial information about the Network and the like. The scan controller 204 starts the scan of the network. At step 304, the scan controller 204 initiates the master agent to gather critical and non critical information about the Network that includes the information about the DPUs, the communication links and the humans. Further, the master agent initiates the attacks on the Network. At step 306, MAV graph is generated based on the information collected at step 304 and the attacks on the Network are planned. An MAV graph can be prepared to show the all possible paths to compromise the network that have been planned at step 304. At step 308, the attacks, which were planned in step 304, are launched on the network to compromise the Network. An attack, in general, can be a DPU exploit, a social engineering attack, a communication link or Man in the Middle (MITM) attack or hybrid attack involving two or more of the above mentioned attacks. At step 310, the one or more slave agents are installed on the compromised Network to assist in carrying out further attacks on the Network. The slave agents can replicate themselves, survive when they are isolated from the master agent, can coordinate themselves, and can perform most complex, coordinated and distributed attacks automatically. The slave agents can be assigned their respective tasks by the master agent, such as providing critical information and carrying out further attacks. Thereafter, the slave agents can continue the attacks and provide the results and information to the master agent. So, continuing in a symbiotic manner, the master agent and the slave agents can co-operate among themselves to compromise the Network.

At step 312, the attacks on the Network are performed in multiple-stages. The multiple stages of the attacks can be named as Initiation Stage, Stage1, Stage 2, Stage 3 up to Stage N and the Completion Stage. During the Initiation Stage, the Network is scanned after receiving the scan parameters from the user through the console 202. The scan controller 204 reads the scan parameters, starts the master agent and passes the information about the scan parameters to the master agent. The master agent initiates the attacks on the Network. Further, Stage 1 consists of multiple sub-stages of the attack before the network is fully compromised. In Stage 1, the master agent is the pivot agent.

In order to understand the method, let us consider a case when an administrator machine H1 of the Network is virtually visible to the master agent. The master agent penetrates the Network in the following steps: at step 1, the master agent gathers critical and non critical information about the Network. By gathering the information some more part of the Network becomes virtually visible to the master agent. Let us say web server H2 becomes visible. Now, the administrator machine H1 and web server H2 becomes virtually visible to the master agent. At step 2, the master agent performs the vulnerability assessment on the virtually visible section (i.e. on the administrator machine H1 and web server H2) of the Network and identifies the security holes of the virtually visible part of the Network. At step 3, the master agent performs the Link Analysis to gain the critical or sensitive information such as passwords and updates the Information Model. The Information Model is the abstract representation of the information collected by the system. At step 4, an MAV graph is generated that shows all possible paths or ways to compromise the Network. A possible subset of MAV graph includes an attempt to exploit medium threat vulnerability on the web server H2, an attempt privilege escalation attack on the web server H2 depending on the type of server, and an attempt to exercise building trust on the user U2 working on the admin machine H1. At step 5, the attack plans are made for compromising the Network. Let us assume the attack has been made on the user U2 of the administrator machine H1 to compromise it. Then, at step 6, the slave agent LA1 is installed on the compromised administrator machine H1. This concludes the stage 1 of the attack.

During Stage 2 LA1 becomes the pivot agent for further attack on the Network. The slave agent LA1 launches the attack in multiple sub stages. Again, the steps such as the information gathering, vulnerability assessment and other processes are performed by the slave agent LA1 in the same manner as performed by the master agent during Stage 1. The slave agent LA1 then updates the Information Model. The MAV graph is regenerated or revised to utilize the information about the compromised administrator machine H1 for further attack on the Network. Further, the attack plans are made and the respective attack path is selected to execute the successful attack that leads to compromise another machine in the Network. Finally, the slave agent LA2 is installed on the recently compromised machine. Now, LA2 becomes the pivot agent for further attack on the Network.

The process is repeated till Stage N till the whole network is compromised. The steps in subsequent stages are recursion of the earlier stages outlined. In this fashion, the penetration of the Network continues such that the Network is fully breached. Finally, in the completion stage, where the master agent summarizes the data gathered, passes the data summary to the scan controller 204, cleans up the slave agents and generates the vulnerability assessment or attack report. Further, the hacking attack or vulnerability assessment is terminated when the predefined time is elapsed. At step 314, the scan controller 204 generates a report that contains the details about the compromised Network and vulnerabilities of the Network. Further, the report can be submitted to Network Security Officer (NSO).

FIGS. 4A and 4B show a flow diagram illustrating a detailed method for simulating the hacking attack or a vulnerability assessment operation on the Network, in accordance with an embodiment of the present invention. At step 402, the user provides the scan parameters through the console 202 to initiate the scan on the Network. The scan controller 204 receives a scan request with the scan parameters from the user. Thereafter, the scan controller 204 invokes an intelligence reader. The intelligence reader can be a software program that reads into an intelligence file that contains the state table for one or more scans. The state table provides the sequence in which the one or more modules are invoked by the scan controller 204. In an embodiment of the present invention, the intelligence file may have one or more criteria to invoke a state table. The function of an intelligence file can explained with the help of the following example. Let us consider a scenario when a first criterion is selected based on the one or more scan parameters provided by the user. Based on the first criterion, the intelligence file will have a predefined state table in it. For instance, the state table for the first criterion may first invoke the information gathering module followed by the vulnerability assessment module, the Link Analysis module, the Multiple Attack Vector (MAV) generation module, the execution module, the scan controller 204 or the master agent and the report generation module, not necessarily in this sequence. The intelligence reader generates a complete finite state machine of the scan based on the one or more scan parameters input by the user and the intelligence file. The Network scanning starts after the complete finite state machine of the scan has been generated. Further, the scan controller 204 is responsible for initiating the master agent, reviewing the status of the scan and generating the report. The functionality of the master agent is to maintain the comprehensive database 218 of vulnerabilities and gather the results from the one or more slave agents. Thereafter, the master agent submits the results to the scan controller 204. The master agent can also provide basic agent management and Application Program Interfaces (APIs) to access and control the slave agents that have been installed in different parts of the Network. Master agent is also the single source of communication between the slave agents and the scan controller 204.

At step 404, information gathering phase, vulnerability assessment phase, social engineering phase, and Link Analysis phase are executed by information gathering module, vulnerability assessment module, social engineering module, and Link Analysis module respectively. The information gathering phase is executed to gather the information about the Network such as names and addresses of open ports present in the different DPUs, Operating System (OS) details, running applications, humans (such as employees of an organization and their related information), routers, switches, firewalls, and networking protocols like Dynamic Host Configuration Protocol (DHCP) and Domain Name Server (DNS) are gathered. Information about network topology employed in the Network and physical interconnections among DPUs can also be obtained. The vulnerability assessment phase is executed to identify the vulnerabilities associated with the OS, applications, and software running on the DPUs in the network. The social engineering phase is executed to identify the vulnerabilities associated with the humans. The vulnerabilities associated with humans are the possible actions of humans that may lead to compromise of the network security. This SE phase also identifies the users or the humans who are more likely to leak critical data or information to outside world on purpose or by mistake. The purpose of the social engineering phase is to analyze human behavior and identify possibilities of compromising the network through network users. For example, during SE phase, the system uses various techniques such as sniffing mail from the Network, luring users to leak critical information, stealing passwords using fake resources, etc. to launch an SE attack. The Link Analysis phase is executed to identify the vulnerabilities associated with the networking and communication protocols that can be exploited to access confidential information pertaining to the Network when the networking and communication protocols are compromised. During the Link Analysis phase, one or more techniques such as address resolution protocol (ARP) poisoning, domain name server (DNS) poisoning, and port stealing can be incorporated. Further, during the Link Analysis phase, passive information pertinent to the Network can be procured such as user names, passwords, e-mail addresses, network topology, and the communication links among DPUs and users. Further, sniffing attacks and MITM attacks can also be performed. While the information gathering phase, vulnerability analysis phase, and the Link Analysis phase are executed sequentially, the social engineering phase is executed simultaneously. At step 406, an MAV graph is generated based on the information collected at step 404. The MAV graph shows all possible paths to compromise the network. The MAV graph is dynamic in nature and it keeps modifying itself with changes in the information and parameters affecting the Network. Thereafter, the attack plans are made and a particular attack path is selected to execute the attacks on the Network.

At step 408, an exploitation phase is executed to perform the attacks on the network in order to compromise the Network. The Network can be compromised by exploiting at least one of the communication links, the humans and the DPUs. At step 410, the slave agents are installed on the compromised Network to procure the information about the DPUs on which it is installed. At step 412, the information procured by the slave agents is stored. The collected information can be utilized for further attack on the Network. At step 414, it is checked whether the objectives of the operation are fulfilled or the attack has reached a maximum specified time. If the objectives of the attack are fulfilled or maximum timeout is reached, at step 416, the system stores the status of the scan and data in database 218. At step 418, a report is generated by the scan controller 204 that contains all the details about the compromised Network and the vulnerabilities of the Network. If at step 414, it is found that the objectives are not fulfilled or the maximum timeout has not been reached, then the operation goes back to step 404 and the steps are repeated again.

Figure 5:
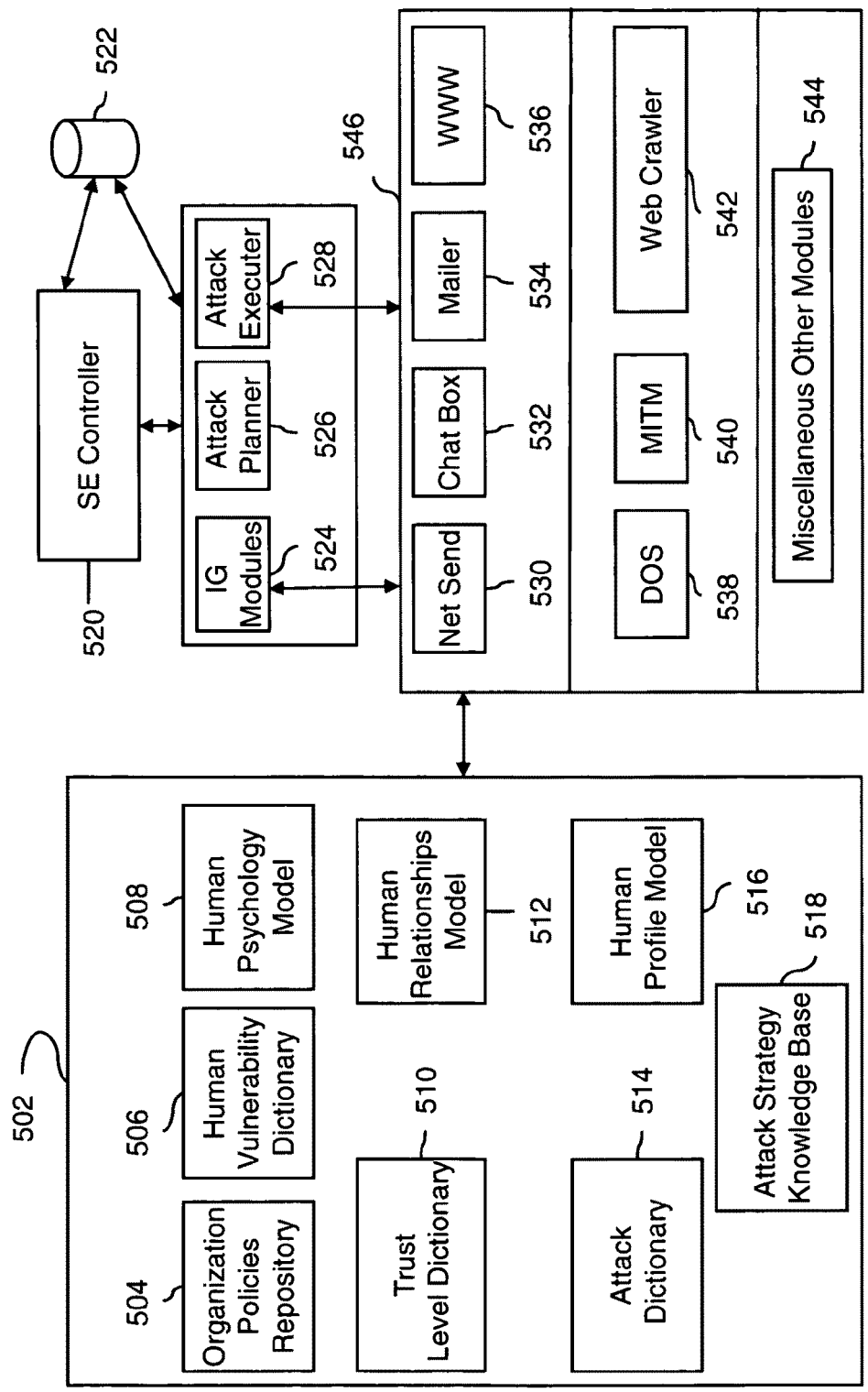
FIG. 5 is a block diagram illustrating the components of social engineering (SE) system, in accordance with an embodiment of the present invention.

FIG. 5 is a block diagram illustrating the components of the social engineering (SE) system, in accordance with various embodiments of the present invention. The SE system helps in carrying out social engineering attack on the Network. Further, the social engineering system identifies a victim user in the Network and gathers the information by any of communication link attacks, other SE attacks, luring the users to leak the personal information such as name, e-mail address, messenger ID, working desktop IP address, etc. The SE system comprises an SE controller 520, an information gathering module 524, an attack planner 526, and an attack executor 528. The SE controller 520 interacts with the information gathering module 524, the attack planner 526 and the attack executor 528, where the information gathering module 524 and the attack executor 528 communicate with one or more communication modules for carrying out a social engineering attack on the Network. The information gathered by the SE controller 520 about the SE attack can be stored in a database 522. The purpose of information gathering module 524 is to collect critical and non critical information about the Network. The attack planner 526 plans the SE attacks on the Network and selects the corresponding attack paths for successful attacks on the Network. The attack planner 526 can also generate an output that can be mapped as a finite state machine in the memory and can be used while executing the scan of the Network. The attack executor 526 executes the social engineering attacks on the Network by communicating with the one or more communication modules. The one or more communication modules are such as Net Send 530, chat box 532, mailer 534, WWW 536, DOS 538, MITM 540, web crawler 542, and miscellaneous other modules 544. The Net Send 530 provides a small console utility that helps to send messages to other systems or users over Network in the MS Windows NT®, MS Windows 2000®, MS Windows XP® and MS Windows 2003®. The chat box 532 can chat with users in the Network. The chat box 532 will act as different roles such as network administrator, IT manager etc. The chat box 532 can identify a target user's messaging Identity and thereafter converse with the target user intelligently to find critical information pertaining to the Network. In an embodiment of the present invention, a past and present behavior analysis of the user can be performed and a prediction of the future can be made based on the analysis. The behavior analysis can be performed through the data obtained from the communication links, Internet activity of the user, chatting usage of the user and the like. It should be appreciated by any person ordinarily skilled in the art that the SE attach is carried out in fully automated manner and no manual intervention is required.

Figure 6:
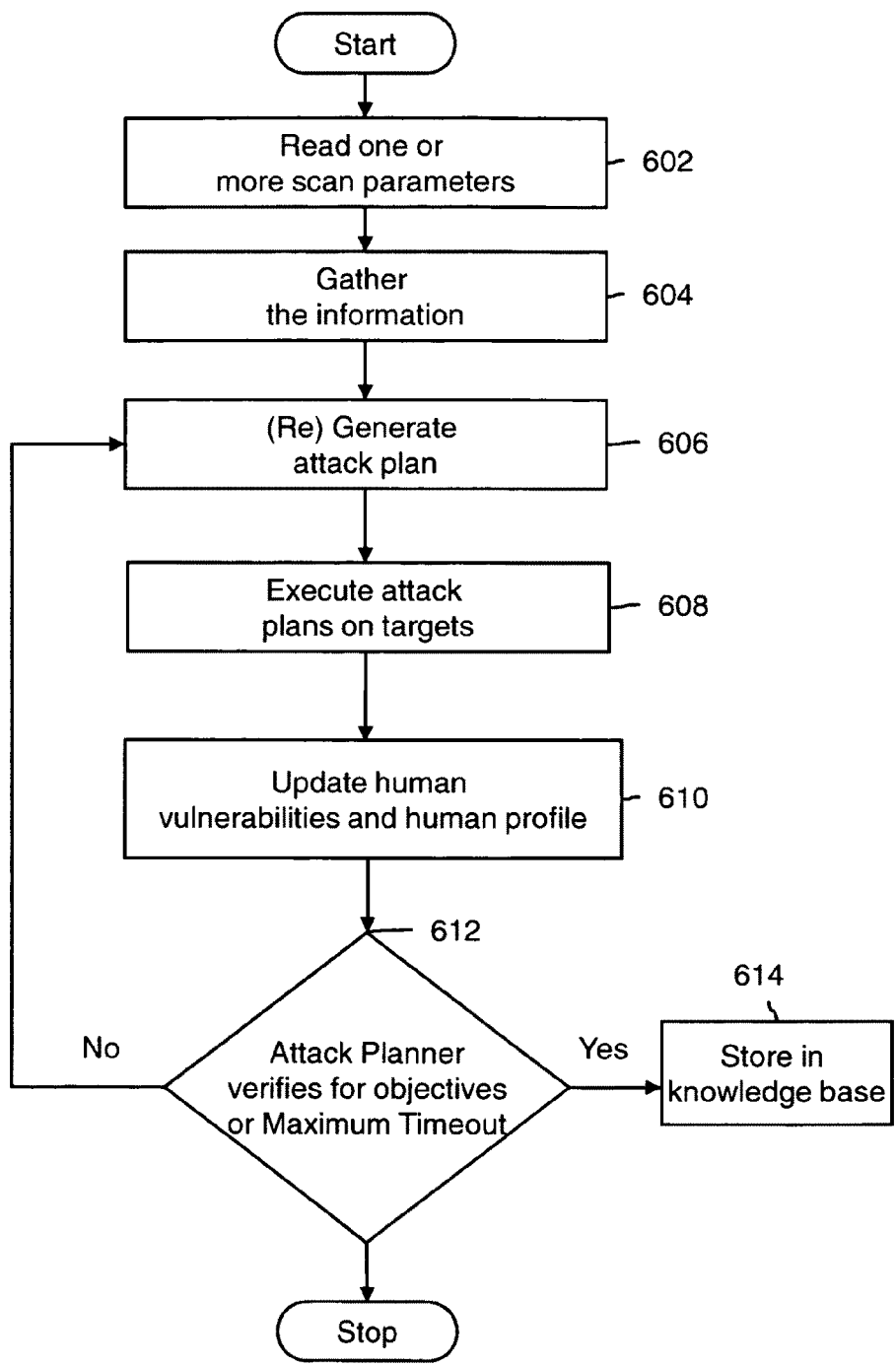
FIG. 6 is a flow diagram illustrating SE system flow for SE attack on the network, in accordance with an embodiment of the present invention.

The mailer 534 can generate spoofed e-mails. Such e-mails look like original mails but they are aimed at obtaining critical data from user by luring him/her to believe that the mails are from authorized sources. In an embodiment, the mailer 534 is capable of sending fake emails to the e-mail addresses collected through a sniffer. The sniffer is a software program to capture data across a Network. The sniffer is used by hackers to capture user identification names and passwords. It can send psychologically appealing e-mails to target users in an attempt to entice him/her to perform an action advantageous to the hacker such as installation of the agent on his/her DPU or revealing his/her password. The (World Wide Web) WWW module 536 can be used for providing web based demographical information gathering for targeted users for performing social engineering attacks. In an embodiment the WWW module 536 can find out information about target users from actively used social and search sites such as Google™, Orkut™, general job portals, etc. The DOS (Denial of Service attack) module 538 performs an attempt to make hosts resource unavailable to the users. This can be done by sending the communication requests to the victim machine such that it cannot respond to the legitimate users or responds slowly so as to render effectively unavailable. The MITM module 540 snoops the data where the attacker establishes the independent connection with the compromised machine and reads the data meant for the user of the compromised machine. The web crawler module 542 is a software program that can create one or more copies of web pages visited by the user for later processing by a search engine that can index the web pages to provide quick searches. The Web crawler module 542 crawls the web pages from discovered web servers and invoke an HTML generator module to generate fake pages similar to the original web pages in order to perform phishing attacks. The miscellaneous other modules 546, but are not limited to, includes listener, and fake repository module. The fake resource repository contains one or more executable hosts of fake services such as Secure Shell (SSHs) and fake SSH File Transfer Protocol (SFTPs). The listener can detect possible connections from agents (both master and slave) on compromised Network elements on a TCP port. The main purpose of the listener 512 is to accept the connection from the agents and register them with the scan controller 204 so that the scan controller 204 can use these agents for information gathering and carrying out future attacks. The information gathered by the one or more communication modules can be stored in a knowledge base 502, where the information stored in the knowledge base 502 can be used by the one or more slave agents for carrying further SE attacks on the Network. The knowledge base 502 that further comprises organization policies repository 504, human vulnerability dictionary 506, human psychology model 508, trust level dictionary 510, human relationships model 512, attack dictionary 514, human profile model 516, attack strategy knowledge base 518. The organization policies repository 504 stores the information about passwords policies, e-mail policies and instant messenger policies of the Network. The human vulnerability dictionary 506 stores information about the possible vulnerabilities associated with the users i.e. the all possible actions of the users through which the users can be made vulnerable. The human vulnerability dictionary 506 stores the information such as users clicking on false links, users disclosing critical information like passwords, users trusting easily on strangers, users using weak passwords, users using same passwords for different accounts, etc. The human psychology model 508 stores the emotional and behavioral characteristics of the humans such as curiosity, self-love, inexperience, greed, courtesy, desire, lust, reciprocity, friendliness, diffidence, etc. The trust level dictionary 510 stores the trust level relationships of the humans with any of the attacker or stranger, friends, team, relative, boss, etc. and the corresponding degree of trust level relationships made on the users with the purpose of compromising the Network. The human relationships model 512 stores the information about relations of humans with the Network and the associated trust level. The human relationships model stores the information about the profession such as main team and the hierarchy and departments of an organization, social information that includes the information about their families, relatives and friends, strangers information and the information about personal accounts of humans. The attack dictionary 514 stores the information about vulnerability class, its type, required trust level and outcomes of the attack such as updating human profile model, gaining privileges on network resources, etc. Further, the vulnerability class stores the information such as address need, impersonation use, conformance use, authority use, trust use, address help, etc. The human profile model 516 stores the characteristics or qualities of the users such as their hobbies, dislikes, security mistakes, current emotional states, personality, attitude, web accounts, etc. that helps in identifying the type or category of the users. The attack strategy knowledge base 518 stores one or more attack strategies corresponding to the possible SE attacks on the humans. The attack strategies can be added or updated by the user or by applying artificial intelligence algorithms. In an embodiment of the present invention an SE attack can be carried out by following the sequence as described in the example that follows. Firstly, to start an SE attack, the SE system identifies IT admin person ID and IM details. The SE system also identifies a corporate web portal used by the victim user and the victim user credential on the web portal that can help in further privilege escalation as part of attack planning in MAV generation. Further, the SE system identifies that IT admin person has a trust level of authority on the victim user as a part of corporate roles and responsibilities. Thereafter, the SE system will send an e-mail to the victim user to update the credential as a part of their password change policy. The e-mail sent by the SE system will look like an original e-mail i.e. the e-mail sent by an authorized person or an IT admin person. Then, the SE system will start SSL MITM attack on the victim user and the victim user will change the web portal password. Finally, the SE system is able to sniff the password of the victim user as part of SSL MITM. Similarly, another SE attack can be carried through the messenger used by the victim user. As a result of the SE attacks the victim user is identified having vulnerabilities such as ignoring the fake certification warning, trusting on fake e-mails, etc. FIG. 6 is a flow diagram illustrating SE system flow for SE attack on the Network, in accordance with an embodiment of the present invention. At step 602, the scan controller 204 reads the scan parameters for the network to start scan on the Network. At step 604, critical and non critical information about the Network is gathered by the information gathering module 524. At step 606, the MAV graph is generated or regenerated based on the information collected at step 604. Further, the attacks plans are generated for the generated MAV graph by the attack planner 526. At step 608, the social engineering attack is executed by the attack executor 528 on the users. The social engineering attack can be made by using at least one of the communication modules that are part of the SE attack system explained above. At step 610, the information such as human vulnerability dictionary 506 and human profile model 516 are updated. At step 612, the attack planner 528 verifies whether the objectives are achieved or a maximum timeout is reached or not. If the objectives are achieved or maximum timeout is reached, step 616 is performed. At step 616, the information gathered from the SE attack is stored in the SE repository or in knowledge base 224. If at step 612, if is determined that the attack objectives are not yet achieved or maximum timeout is not reached, the process goes back to step 604. Thereafter, the whole process is repeated again to successfully carry out SE attack.

Figure 7:
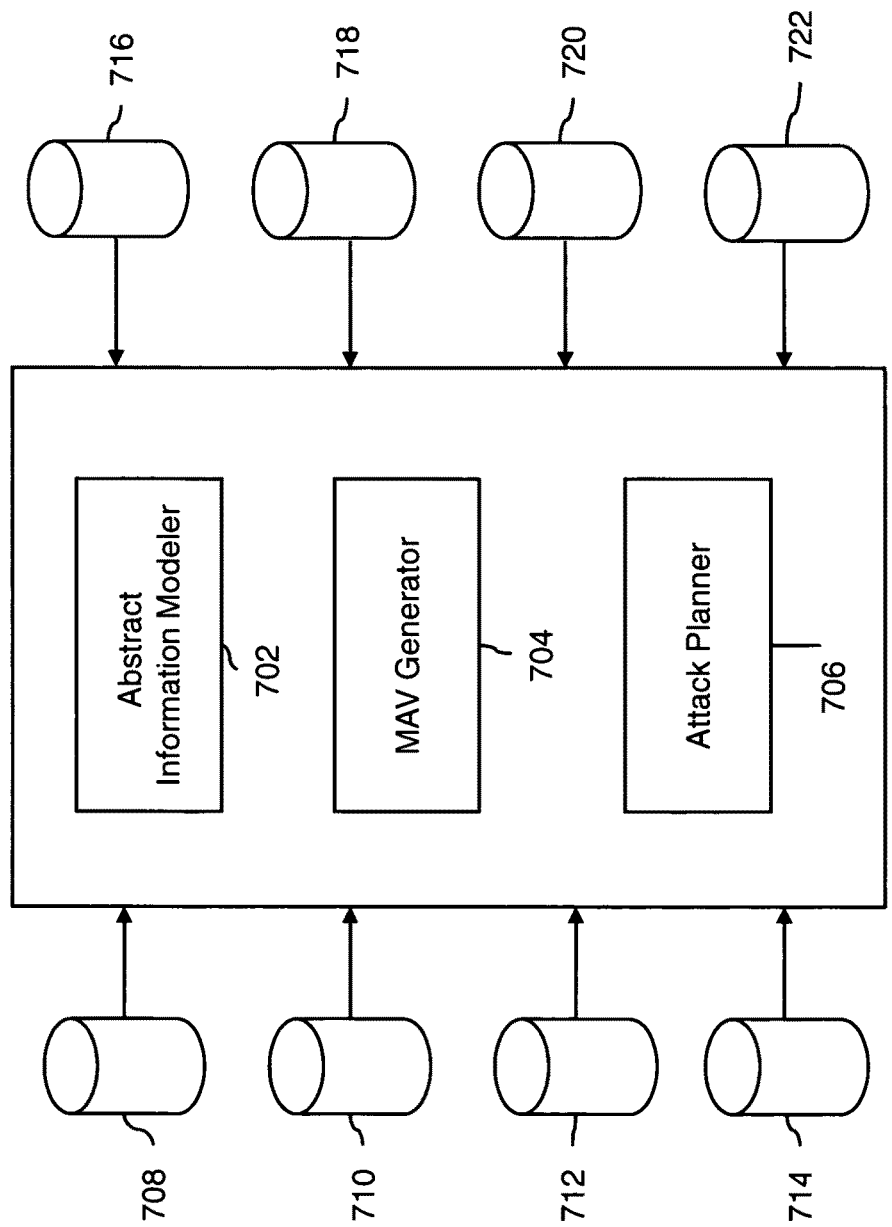
FIG. 7 is a block diagram illustrating the components of multiple attack vector (MAV) system, in accordance with an embodiment of the present invention.

FIG. 7 is a block diagram illustrating the components of the Multiple Attack Vector (MAV) engine, in accordance with an embodiment of the present invention. During the MAV generation phase, an attack graph is generated to identify each path that denotes a sequence of atomic attacks that can lead to a potential compromise of at least one Network element. The atomic attacks are defined as the possible attacks on a DPU when certain preconditions are true. One objective of the intelligent MAV generation phase is to generate attack plans for one or more objectives and identify all possible ways in which the Network elements can be compromised. Another objective is to prioritize various vulnerabilities across different systems which are critical for a particular system. The vulnerabilities can be prioritized based on the parameters such as sources of attack, destination of attack, given source and destination of attack, and one or more parameters for maximizing security and minimizing risk. Further, the set of attacks include vulnerabilities of users of DPUs and communication links connecting different DPUs.

FIG. 7 is a block diagram illustrating the components of MAV system, in accordance with an embodiment of the present invention. FIG. 7 is shown to include abstract Information Model 702, MAV generator 704, and attack planner 706. The abstract Information Model 702 stores the information gathered by multiple stages of the attacks. It is a simplified model of the Information Model generated by the system as a part of the process. The Information Model is updated as when the information in various stages is discovered. The MAV generator 704 generates the MAV graph based on the information collected at step 404 of FIG. 4. The attack planner 706 plans the attacks based on the based on the information generated by the MAV graph. The information collected in this MAV generation phase can be stored in one or more repositories. The one or more repositories includes vulnerability knowledge base 708, attacks repository 710, attack template repository 712, attack strategies repository 714, Information Model 716, detected vulnerabilities 718, collected information 720, agent database 722. The vulnerability knowledge base 708 stores the vulnerabilities, their metadata information like vulnerable platforms and their versions, remote or locally exploitable vulnerability etc. The attacks repository 710 stores the multiple attack vectors associated with different targets types and their corresponding vulnerabilities. The Multiple Attack Vector (MAV) is the set of attack vectors that may lead to compromise the critical systems that would not have been possible with direct vulnerabilities on the critical systems. An attack vector is defined as set of exploits/attacks associated vulnerabilities of different individual severities on the DPUs, the communication links and the users. Each of the attacks is associated with preconditions and post-conditions. The preconditions include various properties or features associated with various entities involved in the attack. For example, the preconditions may include attacker's connectivity, privilege required etc., victims' connectivity, their vulnerabilities and interconnectivity between the attacker and the victims. The post conditions include the privileges gained or the data collected after a particular vulnerability has been exploited. The attack template repository 712 contains the attack template for each of the attacks in a predefined format. For each attack, an attack template exists in the IVIZ attack definition language (iADL). The scan controller 204 contains an iADL parser that can parse the attack templates and generate appropriate attack finite state machine which can be executed for testing on the Network. The attack strategies repository 714 stores one or more strategies corresponding to the one or more attacks. Each strategy will have a type, and zero or more subtypes that identify the category of the attack strategy. Typical types can include injection attack, denial of service attack, cryptanalysis attack, and the like. Similarly, typical subtypes of denial of service attack can be: DOS resource starvation, DOS-system crash, DOS-policy abuse. The attack strategies repository is capable of specifying, storing and learning new attacks from the previous attacks. This can be done either by the user of the system by applying artificial intelligence algorithms. Hence the MAV system is self learning and dynamic in nature.

The Information Model 716 is the abstract representation of the information collected by the system. The Information Model 716 keeps on building by collecting the information during the various stages of the attacks. The detected vulnerabilities 718 store the vulnerabilities associated with the DPUs, the communication links and the users. The collected information 720 stores the information about the Network such as network topology, access controls, integrity and the like. The agent database 722 stores the agent specific information. This information can be data about interaction and communication among agents, agents' location in the Network, their privilege level, and resource access on the hosts running the agents. In an embodiment of the present invention, the attack strategies repository stores the information or data in the required format. Each attack strategy has type and its sub-types, attacker intent, exploitable vulnerability, participants, flow of attacks, pre-conditions and post conditions, follow on attacks and related strategies. Each strategy will have a type, and zero or more subtypes that identify the category of the attack strategy. Typical types include Injection Attack, Denial of Service Attack, Cryptanalysis Attack, etc. Examples of typical subtypes for Denial of Service for example would be: DOS Resource Starvation, DOS-System Crash, and DOS-Policy Abuse. The attacker intent filed identifies the intended result of the attacker. This indicates the attacker's main target and goal for the attack itself. For example, the attacker intent of a DOS Bandwidth Starvation attack is to make the target web site unreachable to legitimate traffic. The exploitable vulnerability field indicates the specific or type of vulnerability that creates the attack opportunity in the first place. The participants are one or more entities that are required for this attack to succeed. This includes the victim systems as well as the attacker and the attacker tools or system components. The name of the entity should be accompanied by a brief description of their role in the attack and how they interact with each other. The flow of an attack field identifies how the attack is going to take place. Every attack must have some context to operate in and the conditions that make the attack possible. The conditioned and post conditions section describes what conditions are required and what other systems or situations need to be in place in order for the attack to succeed. For example, for the attacker to be able to execute an Integer Overflow attack, they must have access to the vulnerable application. That will be common amongst most of the attacks. However if the vulnerability only exposes itself when the target is running on a remote RPC server, that would also be a condition that would be noted here. Follow-on attacks are any other attacks that may be enabled by this particular attack strategy. For example, a Buffer Overflow attack strategy is usually followed by Escalation of Privilege attacks, Subversion attacks or setting up for Trojan Horse/Backdoor attacks. This field can be particularly useful when researching an attack and identifying what other potential attacks may have been carried out or set up. The field of attack strategy describes how the current strategy is related to existing strategy.

Figure 8:
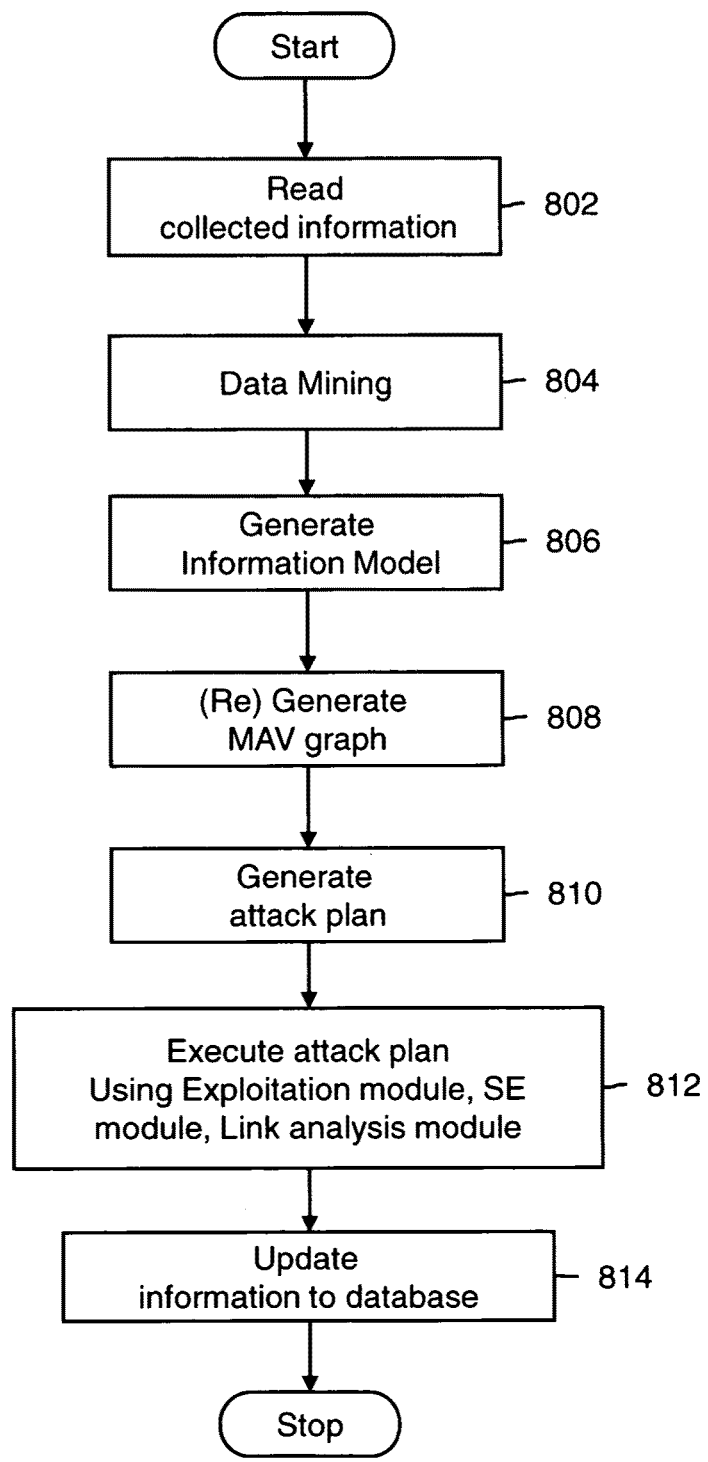
FIG. 8 is a flow diagram illustrating MAV system flow for generating MAV graph, in accordance with an embodiment of the invention.

FIG. 8 is a flow diagram illustrating MAV system flow for generating a MAV graph, in accordance with an embodiment of the invention. At step 802, the information collected in the MAV generation phase is read by the MAV generator 704 to generate MAV graph based on the collected information about the Network or vulnerability information provided by the vulnerability assessment phase. At step 804, data mining is performed by applying data mining algorithms to find any critical information hidden for example credentials, hidden URLs etc. This information further can be used to generate new attack vectors in real time. At step 806, the Information Model 716 is generated which is the abstract representation of information collected by the overall system so far. The Information Model keeps on building and adding the information of multiple stages of the attacks. At step 808, MAV graph is generated based on the collected information that shows all the possible paths to compromise the Network. The attack graph can be utilized to simulate and plan the one or more attacks on the Network. The attack graph is unique in sense that the attack graph keeps on modifying itself with changes and information in parameters affecting the Network. Further, the attack graph can modify itself dynamically and hence modify the attack to perform maximum penetration. At step 810, the attacks plans are generated by attack planner 708. The attack planner 708 plans the attack and selects the attack paths for successful attacks on the network. At step 812, the attack plans are executed using exploitation module, social engineering module and Link Analysis module to compromise the Network. At step 812, the information collected during the MAV generation phase is updated to the one or more repositories. The one or more repositories includes vulnerability knowledge base 708, attacks repository 710, attack strategies repository 712, Information Model 714, detected vulnerabilities 716, collected information 718, agent database 720.

Figure 9:
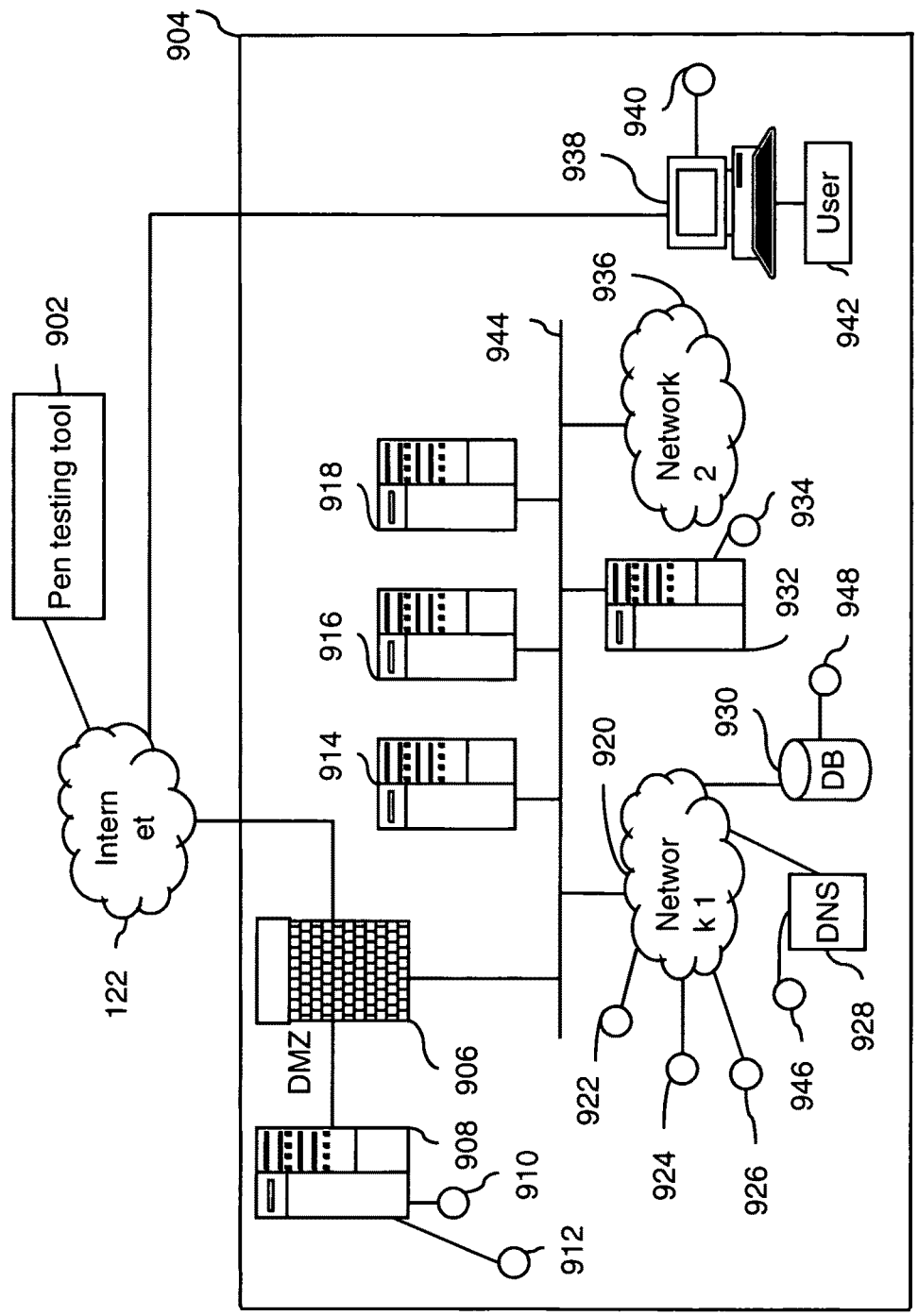
FIG. 9 is an exemplary structure of the network for simulating the hacking attack on the network, in accordance with an embodiment of the present invention.

FIG. 9 is an exemplary structure of the network for simulating the hacking attack on the Network, in accordance with an embodiment of the present invention. FIG. 9 shows a Penetration Testing (PT) tool 902, the Internet 122, a target network 904 includes a host H1 906, a firewall 908, a host H2 914, a host H4 916, a host H5 918, a host H3 932, a web server application A1 910, a content management server application (CMS) A2 912, a web browser application A3 940, an application server A4 934, a LAN/Subnet 944, a Network 2 936, an admin machine 938, and an admin user 942, a network1 920 further comprises a Domain name Server (DNS) 928, a database 930, a DNS application 946, and a database application 948, an application A5 922, an application A6 924, and an application A7 926.

In the current example, the PT tool 902 is placed outside the Network 904, i.e. in the Internet 122. The pen testing tool 902 provides the console 202 so that the user can input the scan parameters; the scan controller 204 initiates the scan on the Network 904. Further, the scan controller 204 starts the master agent to initiate the attack on the Network 904. The admin machine 938 is visible to the master agent with an admin user 942 working on it. The master agent starts collecting the information about the Network 904. The admin user 942 can access the internet 122 through the admin machine 938. The admin machine 938 runs web browser 940 using which the admin user 942 can access the internet 122. The host H1 908 hosts web server application 910 and CMS (content management server) application 912. The host H1 908 is a web server with web server 910 instance running on it. The Host H1 908 is placed in the DMZ zone of the firewall 906 and separated from LAN/Subnet 944 via firewall 906. Also, the host H2 914, the host H4 916, and the host H5 918 are on the internal LAN 944. The host H3 932 hosts application server 934. The host H3 932 is the application server with application server instance 934 running on it. Further, DNS 928 and database 930 are connected to the network1 920. The admin user 942 has access to web server host H1 908, application server host H3 932 the host H2 914, the host H4 916, and the host H5 918. The network1 920 and network2 936 are accessible from the Subnet 944. The Network 1 920 hosts multiple applications such as the application A5 922, the application A6 924, and the application A7 926. These applications A5 922, A6 924 and A7 926 share trust relationship and uses the DNS application 946 for resolving URL of Database application 948 and they store data in the Database 930. The web server host H1 908 can have Web application vulnerabilities. This is the information as collected by the master agent about the Network 904. Further, based on the collected information master agent generates MAV graph. A subset of MAV includes: multiple host level security vulnerabilities i.e. the hosts H2 914, the host H4 916, and the host H5 918 in the subnet 944 can have vulnerabilities, communication links level vulnerabilities i.e. the network including the subnet 944 and the DNS 928 may be susceptible to communication link attacks, humans vulnerabilities i.e. the admin user 942 may be vulnerable to SE threats. Then the possible attack plans are made and the corresponding attack path is chosen for successful attack on the Network 904. Here for example let us assume SE attack is launched on the admin user 942 and the admin machine 938 is compromised. Thereafter, the new agents are installed on the compromised admin machine 938 to carry out further attacks on the Network 904. Now, the new installed agents will start procuring the information about Network 904 to compromise another machine in the Network 904. In this fashion the network penetration continues in multiple stages until the Network 904 is fully breached.

Figure 10:
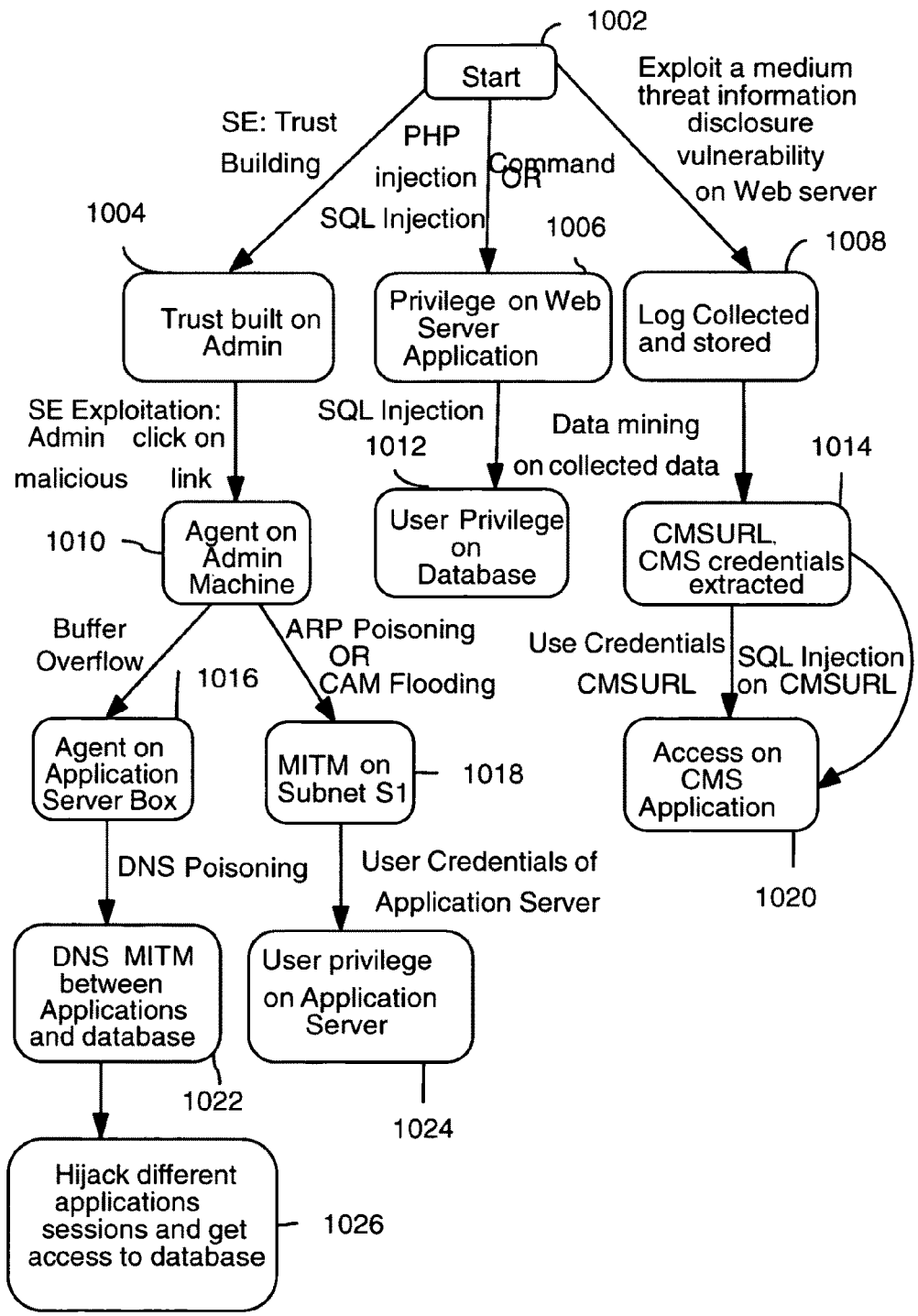
FIG. 10 is an example of an MAV graph that shows various possible paths or alternatives generated of compromising the network, in accordance with an embodiment of the present invention.

FIG. 10 is an example of MAV graph that shows various possible paths or alternatives generated for compromising the Network, in accordance with an embodiment of the present invention. To start with the hacking attack, the one or more scan parameters are provided by the system and the system creates the master agent to initiate the attack on the Network. Further, the master agent gathers critical and non critical information about the Network and simultaneously some part of the Network becomes visible to the master agent. The information gathered can be stored in the Information Model. Further, MAV graph is generated based on the collected information and MAV shows the various possible paths of compromising the Network. Let us assume the three possible alternatives for the one or more attacks on the Network. At step 1002, we start with the procedure of MAV generation. At step 1004, being a first alternative is to exploit vulnerabilities of humans by building trust on the target user or admin user in the Network to compromise the admin machine. Further, at step 1010 an agent is installed on the compromised admin machine. Thereafter, at step 1016, the communication requests are sent to the application server so that buffer of the application server overflows and then an agent can be installed on the application server box. As installed agent can access DNS application and DNS poisoning can be performed by the agent that results into DNS MITM attack between applications and database, at step 1022. Hence at step 1026, the agent can hijack all the application sessions and can gain access to database. Further, at step 1018, ARP techniques or CAM flooding techniques can be used as another alternative for MITM attack on the subnet. At step 1024, the users have privileges to the application server. At step 1006, being a second alternative path to compromise the Network is to make use either of SQL injection or PHP command injection to gain access or privileges on web server application. Further, at step 1012, the SQL injection technique is used to gain privileges to database. The third alternative is to make use of low level and medium level threat vulnerabilities of web server that allows the exposure of certain data or log. At step 1008, the log or data can be collected. Further, at step 1014, data mining can be done on the log or information collected to find out or to extract CMS URL, CMS credentials. Thereafter, at step 1020, CMS URL or CMS credentials can be used to gain access to CMS application. The other alternative to gain access to CMS application is by using SQL injection technique.

Figure 11:
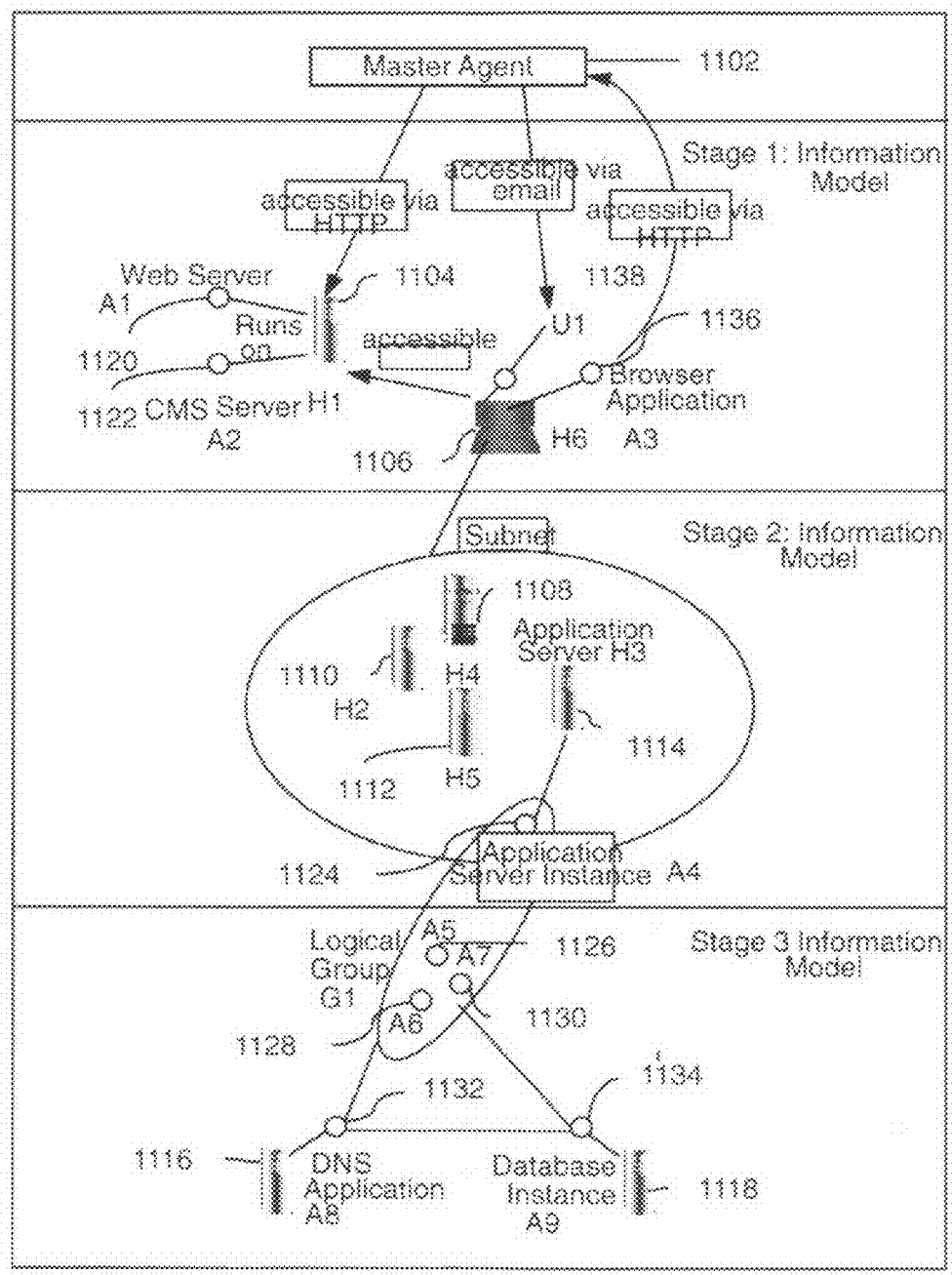
FIG. 11 is an example of an Information Model that shows the multiple stages of the Information Model, in accordance with an embodiment of the present invention.

FIG. 11 is an example of an Information Model that shows the multiple stages of the Information Model, in accordance with an embodiment of the present invention. To initiate scan on the Network one or more scan parameters are provided from the system. Further, the system starts a master agent 1102. The master agent 1102 gathers critical and non critical information about the Network. Further, the Information Model is created to store the information gathered by the master agent 1102 and is updated as new information about the Network is discovered. The user U1 1138 admin of host h6 1106 of the Network can access one or more application such as an application A5 1126, an application A6 1128, an application A7 1130 along with DNS application A8 1132 of DNS 1116 and database application A9 1134. The host h6 1106 host web browser application A3 1136. The subnet also host application server h3 1114 hosting an application instance A4 1124 running on it. The one or more applications belong to logical group G1. Host h1 1104 hosts two applications such as web server application 1120 A1 and CMS server 1122 A2. Further, the various stages of information gathering for building an Information Model includes: At stage 1, master agent access 1102 user U1 1138 via mail through the internet and simultaneously access web server through HTTP channel. At stage 2 data collection is done by harnessing data from stage 1 and by cultivating trust relationship U1 1138 shares with rest of internal LAN and host h1 1104 shares with the hosted one or more applications and underlying database 1118. The subnet becomes visible to master agent. Data collection at this stage includes host h2 1110, host h3 1114, host h4 1108, host h5 1112 and application instance A4 1124 hosted on the host h3 1114. At stage 3, the master 1102 agent utilizes the trust relationship made with the application A5 1126, the application A6 1128 and the application A7 1130 shares with DNS instance 1132 A8 and database instance 1134 A9. In this stage DNS instance A8 1132 and database instance A9 1134 becomes visible to master agent 1102. The information collected will go on adding to the Information Model that can be used for MAV generation and attack on the Network. Thereafter, the information collected can be stored in the Information Model for the one or more attacks on the Network.

The present invention provides a method, system and computer program product for finding vulnerabilities associated with the network of DPUs inclusive of humans (users) and communication links connecting the network of DPUs. There are multiple advantages of this invention such as providing an on-demand pen testing approach which is truly automatic and distributed in nature. Further, the present invention provides MAV based pen testing approach, where MAV can be used for attack plan and exploitation. The present invention also provides an agent framework to carry out a multi-stage attack with no/minimal human intervention. The present invention further provides a complete automation of SE architecture. The present invention also provides self learning environment as it applies artificial algorithms for updating attack strategies and attack rules. The present invention also provides a framework to integrate one or more propriety or third party tools and products with one or more tools selected from a group comprising vulnerability tools, social engineering tools, exploitation tools, and the like to enhance the impact of the hacking attack on the network.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor. The microprocessor can be one or more general- or special-purpose processors such as a Pentium®, Centrino®, Power PC®, and a digital signal processor. The microprocessor is connected to a communication bus. The computer also includes a memory, which may include Random Access Memory (RAM) and Read Only Memory (ROM). The computer system also comprises a storage device, which can be a hard disk drive or a removable storage device such as a floppy disk drive, optical disk drive, and so forth. The storage device can also be other similar means for loading computer programs or other instructions into the computer system. The computer system also includes one or more user input devices such as a mouse and a keyboard, and one or more output devices such as a display unit and speakers.

The computer system includes an operating system (OS), such as Windows, Windows CE, Mac, Linux, Unix, a cellular phone OS, or a proprietary OS.

The computer system executes a set of instructions that are stored in one or more storage elements, to process input data. The storage elements may also hold data or other information as desired. A storage element may be an information source or physical memory element present in the processing machine.

The set of instructions may include various commands that instruct the processing machine to perform specific tasks such as the steps that constitute the method of the present invention. The set of instructions may be in the form of a software program. The software may be in various forms, such as system software or application software. Further, the software may be in the form of a collection of separate programs, a program module with a larger program, or a portion of a program module. The software might also include modular programming in the form of object-oriented programming and may use any suitable language such as C, C++ and Java. The processing of input data by the processing machine may be in response to user commands to results of previous processing, or in response to a request made by another processing machine.

While the preferred embodiments of the invention have been illustrated and described, it will be clear that it is not limited to these embodiments only. Numerous modifications, changes, variations, substitutions and equivalents will be apparent to those skilled in the art, without departing from the spirit and scope of the invention, as described in the claims.

We claim:

1. A method for performing one or more social engineering attacks on a plurality of humans connected in a Network for assessing vulnerabilities of the plurality of humans in the Network, the Network comprising at least one of a plurality of data processing devices, memory devices, and a plurality of communication links, the method comprising:
   gathering information about human profiles including collecting information about target users from actively used social and search sites, and performing at least an automated Social Engineering (SE) phase and updating an Information Model based on the gathered information, wherein the automated Social Engineering phase on the Network is performed by performing at least one of:
   creating a human profile,
   creating a human psychology model,
   impersonating or building the trust between an attacker and a target;
   generating a Multiple Attack Vectors (MAV) graph based on the information gathered in the Information Model and one or more scan parameters for showing possible paths to compromise the Network;
   planning the one or more social engineering attacks based on the MAV; and
   launching the one or more social engineering attacks to access vulnerabilities in the humans of the Network.

2. The method of claim 1, further comprising revising the MAV graph after the Network is compromised, wherein the MAV graph is revised for utilizing the information about the humans for the one or more social engineering attacks.

3. The method of claim 1, further comprising enhancing the system capability to generate the MAV graph by adding new attacks and the corresponding attack strategies in the format required by a system.

4. The method of claim 1, further comprising enhancing the system capability to generate the MAV graph by applying self learning algorithms based upon custom developed Genetic and Artificial Intelligence (AI) algorithms.

5. The method of claim 1, further comprising enabling constant interaction between at least one master agent and at least one slave agent, wherein the interaction comprises coordination, planning, monitoring and reselection of the at least one slave agent.

6. The method of claim 1, further comprising:
   performing the automated Social Engineering phase on the Network, wherein the automated Social Engineering phase is performed to gain access to critical information that pertains to the plurality of humans, the automated Social Engineering phase is further performed by performing at least one of:
   sniffing a mail from the Network to impersonate the plurality of humans,
   crafting the replies of the mail,
   including a malicious link in the reply, and
   luring the plurality of humans to leak critical information.

7. The method of claim 1, further comprising launching the one or more social engineering attacks in a plurality of stages comprising:
   performing a Link Analysis on a communication taking place among the plurality of humans or the plurality of devices to find out the critical information flowing as a result of the communication;
   creating or updating the Information Model, wherein the Information Model comprises the information gathered by at least one master agent about the plurality of devices, the plurality of humans, the plurality of communication links and their relationships;
   gathering data by accessing the Network through the internet and simultaneously accessing web server through a HTTP channel in a first stage, wherein the Network can access a subnet which hosts multiple applications along with a DNS application and a database application;
   harnessing the data from a first stage and by cultivating a trust relationship that the Network shares with a set of neighboring Network; and
   utilizing the trust relationship which the multiple applications share with the DNS application and the database application for launching the one or more social engineering attacks.

8. The method of claim 1, further comprising integrating one or more propriety or third party tools and products with one or more tools selected from a group consisting of vulnerability tools, social engineering tools, and exploitation tools for capturing the information in the Information Model, for generating the MAV graph based upon the Information Model and for launching the one or more social engineering attacks to enhance impact of the one or more social engineering attacks on the Network.

9. The method of claim 1, further comprising enabling the plurality of humans to subscribe to the service, initiating the one or more social engineering attacks and generating the report online over the Internet.

10. A system for performing one or more social engineering attacks on a plurality of humans connected in a Network to assess vulnerabilities of the plurality of humans in the Network, wherein the Network comprises at least one of a plurality of data processing devices, memory devices and a plurality of communication links, the system comprising:

a scan controller to perform a scan on the Network and initiating at least one master agent, wherein the at least one master agent gathers information about human profiles, gathering information about the human profiles including collecting information about target users from actively used social and search sites, and performing at least an automated social engineering phase and updates an Information Model based on the gathered information, wherein the automated Social Engineering phase on the Network is performed by performing at least one of:

creating a human profile,
creating a human psychology model, and
impersonating or building the trust between an attacker and a target;

an automated Social Engineering (SE) architecture for collecting sensitive information that pertains to the plurality of users;

a communication link framework for identifying vulnerabilities associated with the Network and communication protocols;

a Multiple Attack Vector (MAV) engine for generating and storing an MAV graph that shows possible paths by which the Network can be compromised, the Network being compromised by using at least one slave agent and the at least one master agent, wherein the slave agents coordinate among themselves when they are isolated from the master agent; and an agent framework for launching one or more social engineering attacks on the Network.

11. The system of claim 10, wherein the Social Engineering (SE) architecture further comprises:

a SE database for storing the information gathered by a SE phase;

a SE knowledge base for storing one or more information from a group comprising human relationship model, an attack dictionary, an attack strategy knowledge base, organizational policies, a trust level dictionary, a human vulnerability dictionary, a human psychology model, a human relationships model, and a human profile model; and a SE controller for communicating with one or more communication modules.

12. The system of claim 10, wherein the Multiple Attack Vectors (MAV) engine further comprises:

an attack repository for storing one or more social engineering attacks associated with the Network and the vulnerabilities of the Network;

an attack strategies repository for storing attack strategies corresponding to the one or more social engineering attacks, wherein the attack strategies are updated by a human and by an artificial algorithm;

an agent database for storing information related to the at least one master agent and the at least one slave agent;

an Information Model for storing the information related to the Network after the one or more social engineering attacks have been made on the Network; and a knowledge base for storing one or more functional modules and libraries associated with at least one of the one or more functional modules.

13. The system of claim 10, wherein the at least one slave agent replicates on DPUs of humans and the at least one slave agent and the replicated slave agents coordinates among themselves to perform one or more attacks in a distributed manner.

14. A non-transitory computer program product for use with a computer, the computer program product comprising a non-transitory computer usable medium having a computer readable program code embodied therein for performing one or more social engineering attacks on a plurality of humans connected in a Network to assess vulnerabilities of the plurality of humans in the Network, wherein the Network comprises at least one of a plurality of data processing devices, memory devices, and a plurality of communication links, the computer program product comprising:

program instructions for receiving one or more scan parameters;

program instructions for gathering information about human profiles including collecting information about target users from actively used social and search sites;

program instructions for performing an automated Social Engineering phase on the Network, wherein the automated Social Engineering phase on the Network is performed by performing at least one of:

creating a human profile,
creating a human psychology model, and
impersonating or building the trust between an attacker and a target;

program instructions for performing Link Analysis on a communication among the plurality of the users or the plurality of data processing devices;

program instructions for creating or updating an Information Model;

program instructions for generating a multiple attack vectors graph based on an information gathered in the Information Model and the one or more scan parameters; and program instructions for launching one or more social engineering attacks on the Network to compromise the Network.

15. The method of claim 1, further comprising installing at least one slave agent on DPUs of compromised humans for performing the one or more social engineering attacks in a distributed manner and providing the information and results to the at least one master agent.

16. The method of claim 1, further comprising generating and storing a report in knowledge base wherein the report contains details about the vulnerabilities of the humans in the Network.

17. The method of claim 1, wherein launching the one or more social engineering attacks comprises conversing with a target user to find critical information pertaining to the Network.

18. The method of claim 1, wherein launching the one or more social engineering attacks comprises generating one or more fake web pages similar to one or more original web pages in order to perform phishing attacks.

* * * * *